Maurice J. Brau
Hall E. Jarman
INVENTORS

BY John D. Graham

United States Patent Office 3,371,210
Patented Feb. 27, 1968

3,371,210
INORGANIC GLASS COMPOSITION
Maurice J. Brau, Richardson, and Hall E. Jarman, Dallas, Tex., assignors to Texas Instruments Incorporated, Dallas, Tex., a corporation of Delaware
Filed Dec. 31, 1964, Ser. No. 422,800
2 Claims. (Cl. 250—83)

ABSTRACT OF THE DISCLOSURE

Disclosed is a novel glass composition $Ge_3As_3Se_6Te_8$ which, among other things, will serve as an infrared transmitting glass cement. The material has a high index of refraction and is substantially transparent over a broad range of the infrared spectrum. Also disclosed is a method for compounding the glass composition.

---

This invention relates to a glass-like composition, this composition being particularly useful as an adhesive in photodetective devices, especially infrared photodetective devices.

The transmission of information in the infrared region of the energy spectrum has received increasing attention in recent years. A variety of infrared detection systems has been developed composed generally of a detector having a responsive element which is sensitive to light waves in the infrared region and a lens or dome which is in optical contact with the detector. The dome serves many purposes. In addition to intercepting infrared rays at various angles of incidence and focusing them upon the responsive element of the detector, thus increasing the overall detectivity of the whole system, the dome or lense provides physical protection of the detecting elements from their operating environments.

It is necessary therefore to provide a means whereby the infrared dome may be physically attached to the detector. Pursuant to this objective, an adhesive or "cement" is required which has certain desired characteristics. Of primary importance is the requirement that there be no interference with the transmission of infrared energy to the responsive element of the detector. Consequently, the cement must be substantially transparent over a broad range of the infrared spectrum.

A second requirement of the cement is that it have characteristics that will allow its use as a good bonding material. The application of the cement between the dome and the detector ordinarily involves heating the entire structure to a temperature greater than the softening point of the cement, thereby causing the cement to adhere to the detector and the dome, and then rapidly cooling the entire structure. Accordingly, the cement must have a softening point temperature below that of the melting point of the materials that have been used to fabricate the dome and the detector, but high enough to withstand the high temperatures encountered during the operation of the detector system. In addition, the value of the thermal coefficient of expansion of the cement must be relatively close to the thermal coefficient of expansion of the detector and dome materials to avoid having the cement crack and separate during the cooling process and also when the entire system is subjected to widely fluctuating temperatures during operation. The cement must also have good chemical durability, particularly being chemically inert to atmospheric humidity, and must be capable of withstanding both thermal and mechanical shock.

Another necessary requirement of the bonding cement is that it have a very high refractive index, as near as possible to or greater than the value associated with the lens or dome in order to improve the infrared detection efficiency of the system. With the development of infrared domes having higher and higher refractive indexes, this pill ordinarily mean that the bonding cement should have an index of refraction in excess of 3.0 at 25° C.

With these restrictions, most materials known in the art are totally unsuited for use as an infrared "cement." For example, most of the synthetic crystalline infrared transmitters such as the alkali halides have excellent infrared transmission, ranging from five to as high as fifty microns, but have extremely high melting points, high sensitivity to moisture, and generally poor chemical durability. Single crystals of silicon, selenium, and germanium have upper wavelength transmission limits of 20, 21 and 16 microns, respectively, but are expensive and very difficult to fabricate. Silica glasses will transmit infrared radiation but their transmission capability is limited to a wavelength of around 5 microns in two millimeters thickness. Various other nonsilicate glasses known in the art have been found to be transparent in the infrared region, but either their wavelength transmission has been limited or they have been found unsuitable as a bonding agent.

There is presently known in the art an infrared "cement" which partially solves the above-mentioned problems and is presently being used as a bonding agent between the detector unit and its lens or dome. The material used in this cement is an arsenic modified selenium glass. Nevertheless there are disadvantages associated with this substance which limit its desirability as an infrared cement. The softening point of this glass cement is approximately 70° C., thus restricting its use at high temperature operation. Its thermal expansion has been measured at between 34 to $42 \times 10^{-6}/°$ C.; the material will therefore fracture and separate when cooled quickly causing the substance to be unable to withstand large thermal shocks during operation as well as during the frabrication cooling process. The low refractive index of this material, being under 3.0, also limits its use as a cement when the globe or lens glass has a high refractive index.

In view of the difficulties encountered, it is an object of this invention to provide a material, which among other things, will serve as an adhesive or cement which may be used to physically join an infrared lens or dome to an infrared detecting unit, said material being substantially transparent over a broad range of the infrared spectrum.

It is another object of this invention to provide such a material having favorable bonding characteristics.

It is a further object of this invention to provide a material suited for an infrared adhesive or cement having a high index of refraction, i.e., in excess of 3.0.

It is a still further object of this invention to provide a material suited for an infrared adhesive or cement which is capable of withstanding both thermal and mechanical shock.

Consistent with these desired objects and many others, the glass composition $Ge_3As_3Se_6Te_8$ has been developed. The many uses for which this compound is suited will be apparent to one skilled in the art. In accordance with particular characteristics, however, this material may be used as an infrared transmitting glass cement, affording substantial improvement over any infrared cement previously know in the art. This cement is capable of transmitting infrared energy from 1.5 microns to over 14 microns, has a softening point of approximately 182° C., substantially higher than the arsenice modified selenium glass cement, and has an index of refraction of over 3.1. In addition, this cement is capable withstanding a large thermal shock (25° C. to —80° C. in five seconds) and can effectively sustain a very large mechanical shock.

The novel features believed characteristic of this invention are set forth in the appended claims. The invention itself, however, as well as other objects and advantages thereof, may best be understood by reference to the following detailed description, read in conjunction with the accompanying drawings, wherein:

As the initial step of one method for forming the present invention, the glass composition $Ge_3As_3Se_6Te_8$, appropriate amounts of germanium, arsenic, selenium, and tellurium are measured according to the following proportions by weight: 11.3% germanium, 11.6% arsenic, 52.6% selenium and 24.5% tellurium. The measured quantities of the constituent elements are then placed in a previously cleaned quartz ampoule. An example of a suitable cleaning step for the ampoule is by etching thirty minutes in a 10% solution of concentrated hydrofluoric (48% HF) acid, rinsing in deionized water about 15 minutes, treating with aqua regia, rinsing in deionized water and then drying.

After the constituents are placed in the cleansed quartz tube or ampoule, the ampoule is evacuated and sealed to approximately 15 microns of pressure. The sealed tube is then placed in a furnace and gradually heated to a temperature of about 900° C. and held at that temperature for about 16 hours to provide sufficient time for the constituents to react completely with each other. The furnace used is a rocking furnace which may be of any suitable design to provide agitation of the constituents so as to achieve maximum complete reaction thereof. The quartz tube and its contents are then rapidly removed from the furnace, quenched in air, and allowed to cool to room temperature. As a consequence of the above-described process, the glass composition $$Ge_3As_3Se_6Te_8$$

is produced.

Figure 1:
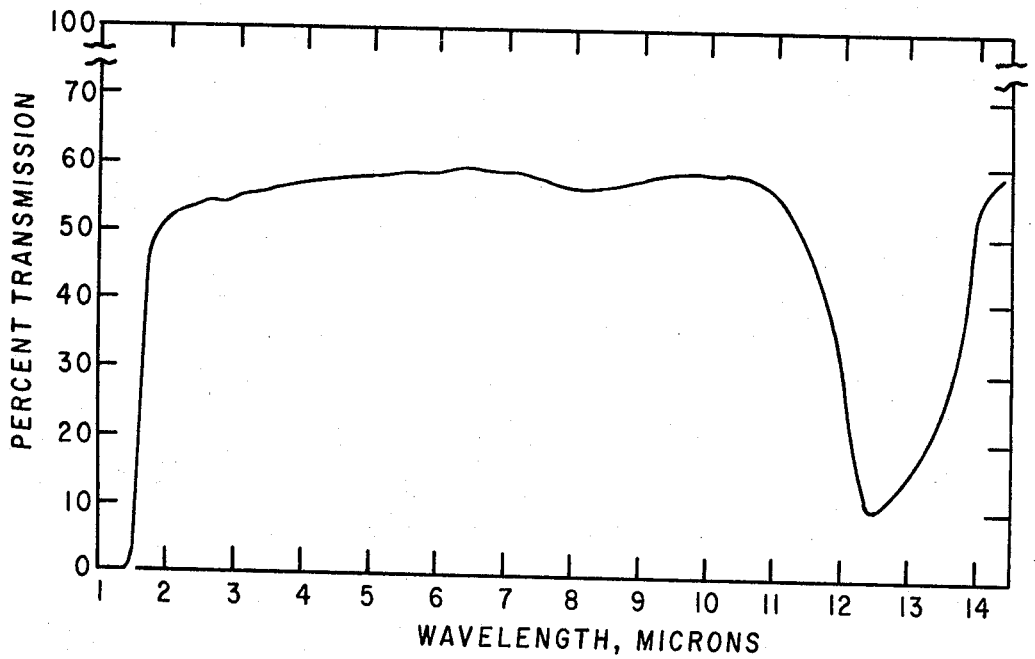
FIGURE 1 is a graphical representation of the percent transmission at room temperatures of various wavelengths of the electromagnetic spectrum, particularly the infrared spectrum, for the glass composition $Ge_3As_3Se_6Te_8$ of this invention.

The chemical and physical characteristics of this compound may suggest many uses to one skilled in the art. In accordance with one particular and desired use for this substance, however, an infrared cement used in infrared detecting systems, there is illustrated in FIGURE 1 a graphical representation of the percent transmission at room temperature of various wavelengths of the electromagnetic spectrum, in particular the infrared spectrum, of the glass composition $Ge_3As_3Se_6Te_8$. It is observed from this graph that this composition has very desirable infrared transmission characteristics, being substantially transparent to infrared rays between approximately 2 microns in wavelength to approximately 14 microns in wavelength.

Figure 2:
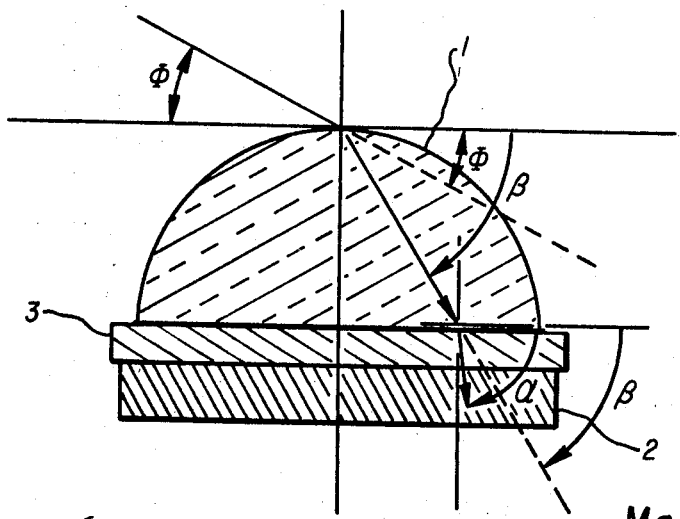
FIGURE 2 illustrates one particular use of the glass composition $Ge_3As_3Se_6Te_8$ of this invention, as an infrared transmitting cement or adhesive within an infrared detection system.

FIGURE 2 depicts the use of the glass composition $Ge_3As_3Se_6Te_8$ as an infrared cement within a particular infrared detecting system. The detecting system is normally composed of a detector 2 having a responsive element sensitive to infrared energy striking its surface and an infrared transmitting element 1 such as a dome or lens in optical contact with the detector. It is presently known in the art to fabricate the detector from doped semiconductor materials usually having low energy gap characteristics. Two such materials that are being used, for example, are doped indium arsenide and doped indium antimonide. The infrared transmitting element 1 may be formed of various materials having desired characteristics. Two of the most common materials presently being used are polycrystalline magnesium fluoride (Kodak Irtran 1) and polycrystalline zinc sulphide (Kodak Irtran 2).

A small amount of the composition  is then inserted between the dome 1 and the detector unit 2 and the entire system heated sufficiently above the softening point of $Ge_3As_3Se_6Te_8$, approximately 182° C. The compound, therefore being in a fluid state, would act as an adhesive or cement 3, and when the entire system is rapidly cooled, the "cement" consequently bonds the dome to the detector unit. The coefficient of thermal expansion of the detector material, indium arsenide or indium antimonide, is approximately $5 \times 10^{-6}/°$ C. while the coefficients of thermal expansion of the dome or lens material Kodak Irtran 1 or Kodak Irtran 2 are approximately $11 \times 10^{-6}/°$ C. and $7 \times 10^{-6}/°$ C. respectively. Due to the fact that the value of the coefficient of thermal expansion of the compound of this invention (approximately $14 \times 10^{-6}/°$ C.) is relatively close to that of the detector material and the dome material, there will consequently be no cracking or separting during the rapid cooling process just described, and the "cement" will be able to withstand a large thermal shock during operation of the entire detection system.

Another desirable characteristic of the glass composition $Ge_3As_3Se_6Te_8$ as an infrared cement is also illustrated in FIGURE 2. When the infrared ray strikes the dome 1 at the angle Φ, the high index of refraction of the dome material causes the ray to be bent toward the detector unit 2 at a larger angle of incidence β, thus allowing for higher efficiency of detection. If the material used for the cement 3 between the dome and the detector has an even higher refractive index than that of the material from which the dome is fabricated, the angle of incidence α will correspondingly be further increased, consequently further increasing the detection efficiency of the system. Materials for fabricating the infrared dome or lens are presently being developed having higher and higher refractive indexes. Irtran 1, for example, has an index of refraction of approximately 1.4 while Irtran 2 has an index of refraction of approximately 2.3. The infrared transmitting cement of this invention composed of the compound $Ge_3As_3Se_6Te_8$ has a refractive index measured at 3.12 at 3 microns wavelength and 3.17 at 8 microns wavelength. This means that not only will the use of the glass composition $Ge_3As_3Se_6Te_8$ as an infrared transmitting cement provide greater detection efficiency, but will allow fabrication of infrared domes from materials of even higher refractive indexes than are presently being utilized.

While the glass composition of this invention has been described with reference to one specific and desired use, it is to be understood that this description is not to be construed in a limiting sense. Various other uses may become apparent to persons skilled in the art without departing from the spirit and scope of the invention as defined by the appended claims.

What is claimed is:
1. A glass composition, consisting essentially by weight of 11.3% germanium, 11.6% arsenic, 52.6% selenium, and 24.5% tellurium.

2. In an infrared detection system comprising a detector sensitive to infrared energy and a transmitting element in optical contact with said detector, an adhesive composed of a glass composition having by weight 11.3% germanium, 11.6% arsenic, 52.6% selenium, and 24.5% tellurium for the purpose of binding said detector to said transmitting element.

References Cited
UNITED STATES PATENTS 3,157,521  11/1964  Cary _____ 106—47
3,261,721  7/1966  Cornish _____ 23—315 X
3,271,591  9/1966  Ovshinsky.

HELEN M. McCARTHY, *Primary Examiner.*